United States Patent [19]
Hughes et al.

[11] Patent Number: 5,602,296
[45] Date of Patent: Feb. 11, 1997

[54] PROCESS FOR IN-SITU BIDEGRADATION OF CHLORINATED ALIPHATIC HYDROCARBONS BY SUBSURFACE HYDROGEN INJECTION

[75] Inventors: Joseph B. Hughes; Charles J. Newell, both of Houston; R. Todd Fisher, Sugar Land, all of Tex.

[73] Assignee: Groundwater Services, Inc., Houston, Tex.

[21] Appl. No.: 514,276

[22] Filed: Aug. 11, 1995

[51] Int. Cl.$^6$ .................................. A67D 3/00; C02F 1/70
[52] U.S. Cl. ..................... 588/205; 405/128; 405/263; 435/262.5; 208/262.5; 210/757; 210/908
[58] Field of Search ..................................... 405/128, 129, 405/263; 588/205, 206, 207; 435/262.5; 208/262.1, 262.5; 210/757, 908

[56] References Cited

PUBLICATIONS

M. D. Lee, et al., "Applicability of In–Situ Bireclamation as a Remedial Action Alternative," Proceedings of the Petroleum Hydrocarbons and Organic Chemicals in Groundwater: Prevention, Detection, and Restoration, National Water Well Assoc., Houston, Texas (1987) 167–185.

R. L. Johnson, et al., "An Overview of In Situ Air Sparging," *Ground Water Monitoring and Remediation* 13:4 (Fall 1993) 127–135.

Christof Holliger, et al., "A Highly Purified Enrichment Culture Couples the Reductive Dechlorination of Tetrachloroethene to Growth," *Applied and Environmental Microbiology* 59:9 (Sep. 1993) 2991–2997.

Thomas D. Distefano, et al., "Hydrogen as an Electron Donor for Dechlorination of Tetrachloroethene by an Anaerobic Mixed Culture," *Applied and Environmental Microbiology* 58:11 (Nov. 1992) 3622–3629.

Wil P. de Bruin, et al., "Complete Biological Reductive Transformation of Tetrachloroethene to Ethane," *Applied and Environmental Microbiology* 58:6 (Jun. 1992) 1996–2000.

*Primary Examiner*—Gary P. Straub
*Attorney, Agent, or Firm*—Rosenblatt & Redano, P.C.

[57] ABSTRACT

The present invention provides a method for stimulating in-situ microbial biodegradation of halogenated organic compounds in an aqueous subsurface environment comprising the delivery of hydrogen, in the absence of nutritional factors, into the subsurface environment.

20 Claims, 2 Drawing Sheets

1

PROCESS FOR IN-SITU BIDEGRADATION OF CHLORINATED ALIPHATIC HYDROCARBONS BY SUBSURFACE HYDROGEN INJECTION

FIELD OF THE INVENTION

The present invention involves the delivery of hydrogen, preferably alone, into a subsurface aquifer to stimulate microbial biodegradation of halogenated hydrocarbons, preferably chlorinated solvents.

BACKGROUND OF THE INVENTION

Halogenated hydrocarbons are aliphatic or aromatic hydrocarbon compounds composed of hydrogen and carbon with at least one hydrogen substituted by a halogen atom (Cl, Br, or F). Halogenated hydrocarbons are used for many purposes, such as solvents, degreasers, pesticides, and dry cleaning agents, and are one of the largest and most recalcitrant groups of contaminants found in groundwater. As a subgroup, the chlorinated aliphatic hydrocarbons, consisting of such compounds as methylene chloride, chloroform, carbon tetrachloride, tetrachloroethene (PCE), and trichloroethene (TCE), are commonly referred to as the "chlorinated solvents." As used herein, the term "chlorinated solvents" shall refer to chlorinated aliphatic hydrocarbons.

As a result of their widespread use, the chlorinated solvents are among the most prevalent groundwater contaminants. In fact, a 1984 survey of water supplies in the United States found that PCE, TCE, and the three isomers of dichloroethene (DCE) were the five most frequent contaminants found in groundwater other than the trihalomethanes.

Contamination of groundwater by chlorinated solvents is an environmental concern because chlorinated solvents have known carcinogenic and toxic effects. For example, carbon tetrachloride is a systematic poison of the nervous system, the intestinal tract, the liver, and the kidneys. Vinyl chloride, which is used in the manufacture of polyvinylchloride (PVC) and is a degradation product of chlorinated ethenes (PCE, TCE, and DCE), is a known carcinogen, and also can affect the nervous system, the respiratory system, the liver, the blood, and the lymph system.

Chlorinated solvents are among a group of heavier-than-water hydrocarbons that often are found in separate phase mixtures in the subsurface called dense nonaqueous-phase liquids ("DNAPLs"). DNAPLs are visible, denser-than-water, separate oily phase materials in the subsurface whose migration is governed by gravity, buoyancy, and capillary forces. When in contact with groundwater, soluble constituents in the DNAPL (such as chlorinated solvents) partition into the water phase to create a dissolved contaminant plume. DNAPL thus can serve as a long-term, continuing source of contamination as the soluble constituents slowly dissolve into moving groundwater.

DNAPLs comprised of chlorinated solvents present a formidable remediation challenge for four reasons: (1) the density of DNAPLs causes the contaminated zone to spread deep below the water table; (2) chlorinated solvents have physical properties that allow movement through very small fractures in the soil (<20 microns) and downward penetration to great distances, even through some clay strata; (3) strong capillary forces make the removal of individual DNAPL trapped in soil pores very difficult or impossible; and, (4) chlorinated solvents are not readily biodegradable under natural conditions and can persist for long periods of time in the subsurface.

Several techniques have been applied to the remediation of sites contaminated by chlorinated solvents; however, most have proven to be costly and inefficient.

SUMMARY OF THE INVENTION

The present invention provides a method for stimulating in-situ microbial biodegradation of halogenated organic compounds in an aqueous subsurface environment comprising delivering hydrogen, in the absence of nutritional factors, into the subsurface environment.

DETAILED DESCRIPTION OF THE INVENTION

Figure 1:
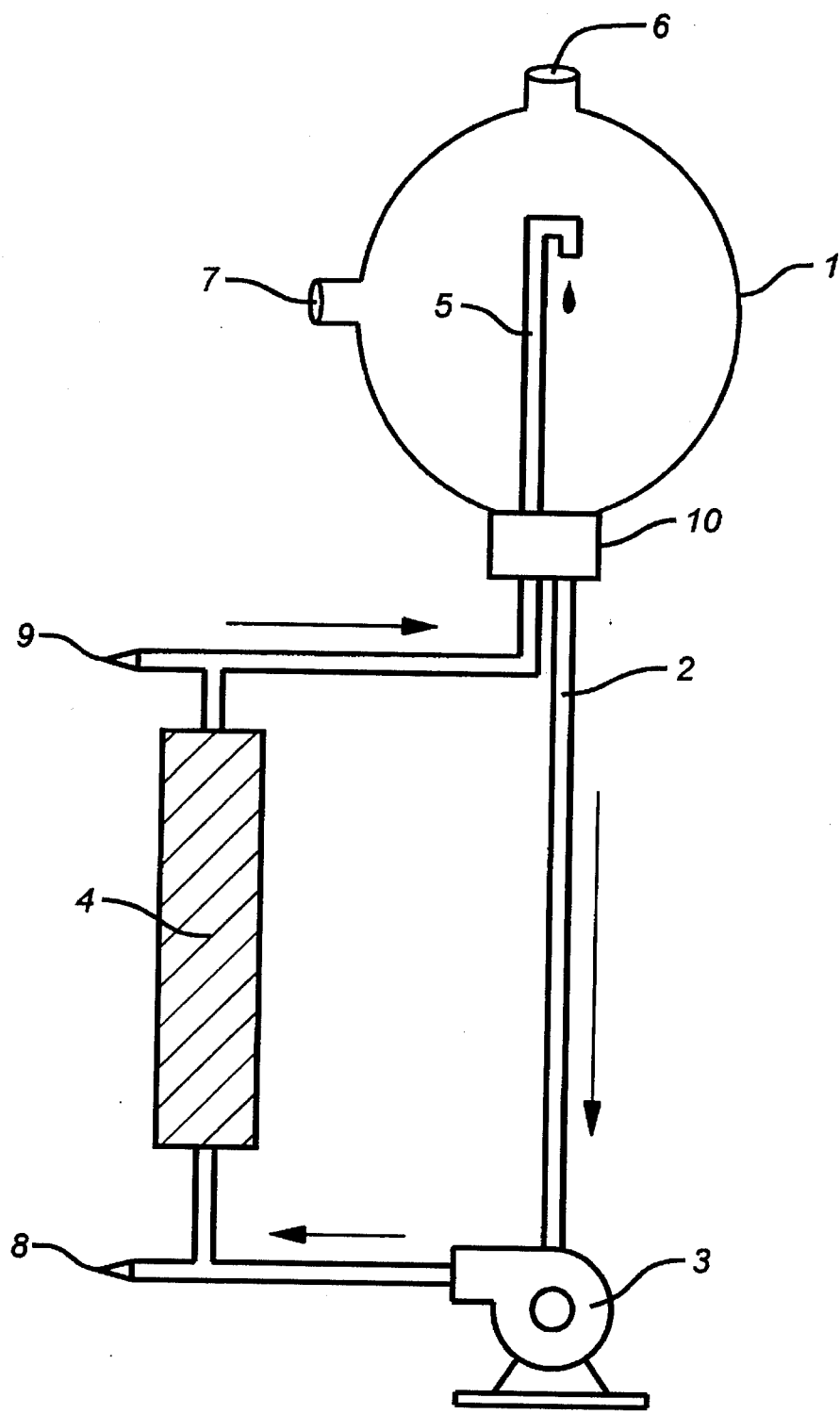
FIG. 1 is a schematic diagram of the experimental apparatus used to test the invention.

Without limiting the present invention, it is believed that chlorinated hydrocarbons are degraded by ubiquitous hydrogen-utilizing anaerobic bacteria capable of mediating the reductive dechlorination process using the chlorinated hydrocarbons as their terminal electron acceptor. The process of reductive dechlorination is depicted by the following half-reaction:

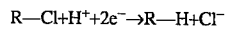

$$R-Cl + H^+ + 2e^- \rightarrow R-H + Cl^-$$

Unlike other enhanced anaerobic degradation processes that have been applied to the remediation of subsurface aquifers, the present invention does not require addition of a separate electron acceptor and nutritional factors. This is because the chlorinated hydrocarbons, themselves, act as electron acceptors and nutritional factors (nitrogen, phosphorous, etc.) generally are present in adequate quantities in the subsurface. The addition of hydrogen as an electron donor, in the absence of nutritional factors, is sufficient to achieve complete reductive transformation of chlorinated hydrocarbons to innocuous end products using the present method.

In addition to providing for the direct stimulation of chlorinated hydrocarbon degrading bacteria, the use of hydrogen as opposed to other electron donors offers several advantages. First, rates of bacterial growth on hydrogen are more rapid than on other methanogenic growth substrates, and the half-saturation constant for hydrogen is very low. This leads to efficient use of hydrogen and low values of $S_{min}$ (substrate concentration required to attain maximum growth rate). Second, bacteria that use hydrogen as a substrate are ubiquitous in anaerobic environments. Third, unlike many electron acceptors such as hydrogen-peroxide (highly reactive), nitrate (causes methanoglobanemia in infants), and sulfate (contributes to bad taste), which may be used to indirectly bring about the degradation of chlorinated aliphatic compounds, hydrogen is an environmentally acceptable compound to add to groundwater. Finally, hydrogen is relatively inexpensive.

A number of methods may be used to introduce hydrogen into the subsurface. These methods may be grouped into two primary categories—1) methods for the direct delivery of hydrogen from an external source, and 2) methods that generate hydrogen in-situ. Methods for the direct delivery of hydrogen are more conventional, and generally involve adaptations to already established processes used in aerobic bioremediation systems.

Methods for the direct delivery of hydrogen include, but are not necessarily limited to, sparging, in-situ diffusion, and pump and reinject. Methods for in-situ generation of hydrogen include, but are not necessarily limited to, induced subsurface chemical reaction, and electrolysis. A preferred method for introducing hydrogen is sparging.

Direct Delivery Systems

Sparging

Methods for conventional air sparging must be modified in order to accomplish hydrogen sparging. In the sparging process, air (or other gas) is forced into a wellbore under sufficient pressure to form branching air channels in the groundwater. In a conventional air sparging system, air channels spread through the aquifer to: 1) strip volatile compounds from the dissolved phase and any non-aqueous phase liquids present along the path of the channels and 2) add oxygen to the groundwater to spur aerobic in-situ biodegradation processes (primarily aimed at non-chlorinated hydrocarbons, such as petroleum fuels). Air sparging is typically coupled with a soil vapor extraction system to collect volatilized constituents for treatment. Air sparging is described in detail in U.S. Pat. No. 5,221,159 to Billings et al., incorporated herein by reference, and in Johnson et al., "An Overview of In Situ Air Sparging," *Ground Water Monitoring and Remediation* 13:4 (Fall 1993) 127–135, incorporated herein by reference.

Unlike a typical air sparging system, a hydrogen sparging system should not volatilize constituents, but should saturate the groundwater in the treatment zone with dissolved hydrogen to stimulate biodegradation. Accordingly, a hydrogen sparging system need not be coupled with a soil vapor extraction system as described by Billings et al. and Johnson et al. In fact, a hydrogen sparging system should use reduced gas pressures and delivery rates set to minimize the volatilization of constituents and the migration of hydrogen gas to the unsaturated zone.

In order to perform hydrogen sparging, sparge wells should be drilled, pushed, or otherwise installed in the area to be treated. The sparge wells preferably should be 1–4 inch diameter cased penetrations driven or drilled into the subsurface to a depth below the lowermost contaminated region. A screened opening should be provided at the bottom of the sparge wells so that the top of the screened interval is below the lowermost contaminated region and the screened opening is located entirely within the saturated zone. The wells preferably should be spaced on 5–25 foot centers throughout the area to be treated or in a line across the downgradient edge of the zone, serving as a reaction wall for migrating groundwater. Vertical wells are the industry standard, but horizontal wells also may be employed.

The source of hydrogen may be any source capable of delivering hydrogen under pressure. Examples include standard industrial pressurized hydrogen gas cylinders or a hydrogen generator equipped with a delivery pump.

The hydrogen source should be connected to the sparge wells via pipes, manifolds, valves and other ancillary equipment as necessary to regulate the flow of hydrogen. The delivery pressure for the hydrogen should be set above the formation entry pressure required to overcome the hydrostatic pressure in the well. Typically, the delivery pressure will range between about 1–5 psig (7–34 kPa). The hydrogen should be delivered under a steady state or pulsed injection rate that has been optimized in the field to match the observed hydrogen utilization rate and to limit the amount of hydrogen released to the surface.

Groundwater samples should be collected periodically from throughout the treatment zone to assess the performance of the system. Soil gas samples also should be collected and analyzed to test for the accumulation of hydrogen gas in the soil vadose zone. Accumulations of hydrogen gas could present an explosion hazard and the delivery of hydrogen should be adjusted accordingly. If the build-up of hydrogen gas becomes a problem, then the injection of a mixture of nitrogen or other inert gas and hydrogen gas (96% inert gas—4% $H_2$) may be used in place of pure hydrogen.

In-situ diffusion

In-situ diffusion of hydrogen may be accomplished using similar procedures except that the cased wells may have a larger diameter (2–8 inches) and drop tube. The wells should be screened across the zone of contamination with the well screen located entirely within the saturated zone. A small diameter drop tube having a diffuser installed at its bottom should be inserted into each well and hydrogen gas should be delivered through the drop tube. Groundwater that passes through the well under natural flow conditions is contacted with the hydrogen gas released through the diffuser. A well seal should be provided above the screened interval to prevent the hydrogen from escaping back through the wellbore to the surface. The resulting groundwater, saturated with dissolved hydrogen, is then distributed throughout the treatment zone by natural advective and diffusive transport.

Because gas delivery rates are slow, in-situ diffusion generally is less efficient than sparging, but may be used in situations where there is a great deal of concern about the build-up of hydrogen gas in the subsurface. Transport limitations require that in-situ diffusion wells be spaced closer together than typical sparge wells.

Pumping/Reinjection

Another method for delivering hydrogen to the subsurface is based on the concept of pumping/reinjection. An example of how this technique has been employed for aerobic in-situ biodegradation via oxygen addition is described in detail in Lee, M.D., et al. "Applicability of In-Situ Bioreclamation as a Remedial Action Alternative." Proceedings of the *Petroleum Hydrocarbons and Organic Chemicals in Groundwater: Prevention, Detection, and Restoration*. National Water Well Assoc., Houston, Tex. (1987) 167–185. Pumping/reinjection for hydrogen delivery involves pumping groundwater from a location downgradient of the contaminated area and passing the pumped groundwater through an aboveground mixing system where hydrogen is dissolved into the flow stream. The hydrogen enriched groundwater is reinjected into the subsurface at a location upgradient of the contaminated region, preferably to create a circular flow system wherein groundwater containing dissolved hydrogen is flushed through the contaminated zone to stimulate biological activity throughout the zone. Many variations of this process may be implemented, including systems that may be described as closed loop without treatment, closed loop with auxiliary treatment, or single pass.

A hydrogen pumping/reinjection system would use 2 to 6 inch diameter cased wells drilled or driven into the subsurface as pumping wells. The pumping wells should be equipped with a screened opening that extends across the zone of contamination, and should be placed downgradient of the area to be treated. Well spacing should be determined by site specific parameters, such as hydraulic conductivity, pumping rates, and available drawdown. Alternatively, a collection trench may be used in place of, or in conjunction with, pumping wells to collect and recover groundwater.

Electrically or pneumatically powered groundwater pumps may be used to induce groundwater flow to the well and to bring collected groundwater to the surface for hydrogen treatment. The groundwater should be contacted with hydrogen gas in an above ground mixing system to dissolve hydrogen in the flow stream such that the hydrogen concentration is near solubility (about 2 mg/L). The hydrogen may be supplied to the treatment unit by standard industrial pressurized hydrogen gas cylinders, a hydrogen generator equipped with a delivery pump, or other source. The hydrogen may be injected or diffused into the process stream.

The system also would need injection wells, comprising 2 to 6 inch diameter cased penetrations drilled or driven into the subsurface and equipped with a screened opening that extends across the zone of contamination. The injection wells should be placed upgradient of the area to be treated, and well spacing, again, should be determined by site specific parameters such as hydraulic conductivity and injection rates. Under appropriate site conditions, infiltration trenches may be used in place of injection wells to deliver the hydrogen enriched water to the subsurface. Infiltration trenches are trenches filled with highly permeable backfill (sand or gravel).

If necessary, injection pumps may be used to increase the hydrostatic head for injecting the hydrogen enriched groundwater to the subsurface treatment zone.

Pipes, manifolds, valves, and other ancillary equipment will be needed to connect the pumping wells to the hydrogen mixing system and the mixing system to the injection wells.

If necessary, the pumping/reinjection system as described above may include some auxiliary groundwater treatment processes to treat the groundwater prior to hydrogen addition and subsequent reinjection. Such additional treatment would be driven primarily by regulatory requirements which prohibit the injection of hazardous substances (extracted groundwater may contain trace quantities of chlorinated compounds or other constituents). Additional treatment might include air stripping, carbon adsorption, or some other physical-chemical process.

If reinjection of extracted groundwater is prohibited altogether, the groundwater recovered from the pumping wells may be treated and discharged to a surface water or other above-ground receptor. In this case, raw water for hydrogen addition would need to be obtained from some independent source, such as a public or private utility.

In-Situ Hydrogen Generation

Methods for in-situ generation of hydrogen are attractive because they appear to overcome many of the limitations of external hydrogen delivery systems, such as poor subsurface distribution of hydrogen, inefficient use of hydrogen, and the hazards of storing and handling bulk hydrogen. However, methods of in-situ generation are experimental in nature, and thus are less preferred than direct delivery systems.

Induced Subsurface Chemical Reaction

Methods for in-situ generation of hydrogen by induced subsurface chemical reaction use the fact that metals or cations with positive standard potentials—such as sodium (Na), potassium (K), lithium (Li), calcium (Ca), magnesium (Mg), zinc (Zn), and iron (Fe)—can be oxidized in solution to release hydrogen. For example, sodium is known to undergo the following reaction:

$$2Na + H_2O \rightarrow 2NaOH + H_2$$

Only the most electropositive metals can release hydrogen directly from water at room temperature where the proton concentration is low. For less reactive metals, such as iron or zinc, hot water or an acidic solution is required to make the hydrogen generation significant:

$$Fe + 2H^+ \rightarrow Fe^{2+} + H_2$$

The in-situ generation of hydrogen by induced subsurface chemical reaction involves injecting a slurry or suspension of fine metal particles much smaller than the median grain size of the aquifer matrix in the injection zone using injection wells. In the case of sodium injection, no further process steps are required. In the case of iron addition, the treatment zone would be flushed with an acidic solution, such as sulfamic or hydrochloric acid, to accelerate the oxidation reaction. The rate of reaction, and the rate of hydrogen release, can be controlled by controlling the pH of the acid flushing solution.

A system for in-situ generation of hydrogen by induced subsurface chemical reaction would require pumping wells similar to those used in a "pumping/reinjection" system. The pumping wells would be used both for hydraulic control of the treatment area and to recover injected fluids.

As in a pumping/reinjection system, electrically or pneumatically powered groundwater pumps would be used to induce groundwater flow to the pumping well and to bring collected groundwater to the surface for metal or acid treatment. Above ground storage and mixing basins would be used to mix a metal slurry or suspension with collected groundwater for injection to the treatment zone. Additional tanks also may be needed to store stock solutions of acid and to mix the acid with the injection stream for the flushing operation. Metering pumps would be used to feed the appropriate quantities of stock solutions to the flow stream.

If necessary, injection pumps may be used to increase the hydrostatic head for injecting the metal enriched groundwater and acid solutions to the subsurface treatment zone. Under appropriate site conditions, infiltration trenches could be used in place of injection wells to deliver the metal slurry or suspension and acid solutions to the subsurface. Pipes, manifolds, valves and other ancillary equipment will be needed to connect the pumping wells to the mixing basins and the mixing basins to the injection wells.

Electrolysis

Hydrogen also can be generated in-situ by the electrolysis of water. To accomplish this, electrodes are installed in the subsurface contaminated region. When connected to an external power source, electrons are moved from the anode to the cathode. The flow of electrons maintains a negative charge at the cathode and a positive charge at the anode. The flow of current is completed through the groundwater by movement of cations ($H^+$) to the negatively charged cathode and anions ($OH^-$) to the positively charged anode. When an $H^+$ ion reaches the cathode, the $H^+$ ion picks up an electron and is reduced to $H_2$ gas. In like fashion, when an $OH^-$ ion reaches the anode, the $OH^-$ ion gives up an electron and is oxidized to $O_2$ gas. The resulting hydrogen gas is used in the subsurface for the reductive dechlorination process. The resulting oxygen either is used in-place, to create aerobic treatment zones, or is extracted by venting to the surface.

A system for hydrogen generation by electrolysis would require metal rod electrodes (iron or other) which may be driven into the subsurface to the depth of the treatment zone and connected to a battery or transformer capable of supplying a direct current voltage to the electrodes.

EXAMPLE 1

The following procedure was repeated three times.

Referring to the apparatus of FIG. 1, and to the numerically identified components of that apparatus, tetrachloroethene (PCE) was injected through injection port 6 and allowed to mix with the reservoir of water 10 contained in the bottom of the headspace chamber 1. A hydrogen atmosphere was maintained in the headspace chamber 1 throughout the duration of the experiment. Sufficient PCE was injected into the reservoir 10 such that, following equilibrium partitioning between the liquid and vapor phases within the chamber, the fluid reservoir contained approximately 0.5–1.0 mg/L PCE. The pump 3 was used to draw fluid from the reservoir 10 and circulate the fluid through the column 4 and back to the headspace chamber 1 via the connection tubing 2. The fluid was circulated at a constant flowrate of approximately 4–5 mL/min.

Within the headspace chamber 1, fluid returning from the column was ejected from the drip tube 5 and allowed to free fall through the chamber back to the fluid reservoir. The drip tube provided a mechanism for achieving the transfer of hydrogen to the fluid (i.e., hydrogen was diffused through the surface of the droplets).

The column 4 was packed with glass beads and was operated in an upflow mode with a fluid volume of approximately 12 mL. At a flowrate of 4 mL/min, this equated to a detention time in the column of approximately 3 minutes. Chlorinated compounds passing through the column were degraded by the biomass grown within the column. Fluid samples were collected through the sample ports 8 and 9 at the inlet and outlet of the column and analyzed.

Figure 2:
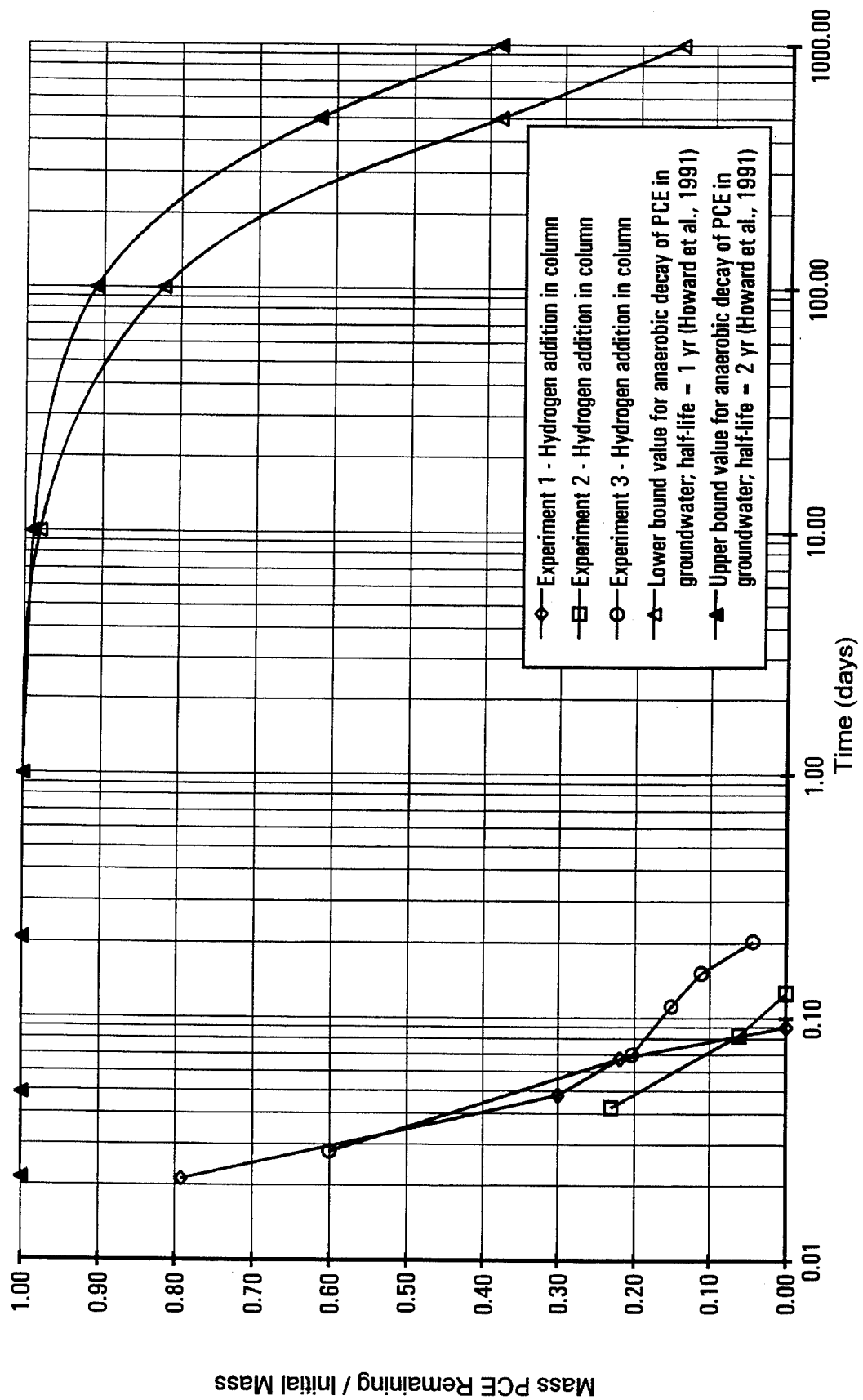
FIG. 2 is a chart showing the results of the testing described in Example 1.

The results from the three experiments are shown in FIG. 2. Based on these results, the degradation rate for PCE in the column was estimated to range from 0.12 mg/L/hr to 0.46 mg/L/hr. This rate is much higher than the natural decay rate of PCE in groundwater, based on values reported in the literature (charted in FIG. 2). P. H. Howard, R. S. Boethling, W. F. Jarvis, W. M. Meylan, and E. M. Michalenko. *Handbook of Environmental Degradation Rates* (1991) Lewis Publishers, Inc., incorporated herein by reference.

Based on the results of the foregoing experiments, the addition of hydrogen to a contaminated aquifer, alone, should be sufficient to stimulate and support the in-situ biodegradation of chlorinated hydrocarbons.

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A method for stimulating in-situ microbial biodegradation of halogenated organic compounds in an aqueous subsurface environment comprising delivering hydrogen in the absence of nutritional factors into said aqueous subsurface environment.

2. The method of claim 1 wherein said halogenated organic compounds comprise chlorinated solvents.

3. The method of claim 1 wherein said method further comprises delivering an inert gas into said subsurface environment.

4. The method of claim 2 wherein said method further comprises delivering an inert gas into said subsurface environment.

5. A method for stimulating in-situ microbial biodegradation of halogenated organic compounds in an aqueous subsurface environment comprising injecting hydrogen in the absence of nutritional factors into said aqueous subsurface environment through at least one sparge well operated on a steady state or pulsed injection cycle at an injection rate and an injection pressure sufficient to stimulate said biodegradation.

6. The method of claim 5 wherein said aqueous subsurface environment has an unsaturated zone, and wherein said injection cycle, said injection rate, and said injection pressure are effective to minimize volatilization of constituents and migration of said hydrogen to said unsaturated zone.

7. The method of claim 5 wherein said halogenated organic compounds comprise chlorinated solvents.

8. The method of claim 6 wherein said halogenated organic compounds comprise chlorinated solvents.

9. The method of claim 5 wherein said method further comprises injecting an inert gas into said subsurface environment.

10. The method of claim 6 wherein said method further comprises injecting an inert gas into said subsurface environment.

11. The method of claim 7 wherein said method further comprises injecting an inert gas into said subsurface environment.

12. The method of claim 8 wherein said method further comprises injecting an inert gas into said subsurface environment.

13. The method of claim 5 wherein said method further comprises determining the hydrogen biologic utilization rate for said aqueous subsurface environment; and, wherein said injection rate substantially matches said hydrogen biologic utilization rate.

14. The method of claim 6 wherein said method further comprises determining the hydrogen biologic utilization rate for said aqueous subsurface environment; and, wherein said injection rate substantially matches said hydrogen biologic utilization rate.

15. The method of claim 7 wherein said method further comprises determining the hydrogen biologic utilization rate for said aqueous subsurface environment; and, wherein said injection rate substantially matches said hydrogen biologic utilization rate.

16. The method of claim 8 wherein said method further comprises determining the hydrogen biologic utilization rate for said aqueous subsurface environment; and, wherein said injection rate substantially matches said hydrogen biologic utilization rate.

17. The method of claim 10 wherein said method further comprises determining the hydrogen biologic utilization rate for said aqueous subsurface environment; and, wherein said injection rate substantially matches said hydrogen biologic utilization rate.

18. The method of claim 12 wherein said method further comprises determining the hydrogen biologic utilization rate for said aqueous subsurface environment; and, wherein said injection rate substantially matches said hydrogen biologic utilization rate.

19. The method of claim 14 wherein said method further comprises determining the hydrogen biologic utilization rate for said aqueous subsurface environment; and, wherein said injection rate substantially matches said hydrogen biologic utilization rate.

20. A method for stimulating in-situ microbial biodegradation of chlorinated solvents in an aqueous subsurface environment having an unsaturated zone, said method comprising injecting hydrogen in the absence of nutritional factors into said aqueous subsurface environment through at least one sparge well, wherein said sparge well is operated at an injection rate, an injection pressure, and on an injection cycle that is effective to stimulate said biodegradation, to minimize volatilization of constituents, and to minimize migration of said hydrogen to said unsaturated zone.

* * * * *

UNITED STATES PATENT AND TRADEMARK OFFICE
CERTIFICATE OF CORRECTION

PATENT NO. : 5,602,296
DATED : February 11, 1997
INVENTOR(S) : Joseph B. Hughes, et al.

It is certified that error appears in the above-indentified patent and that said Letters Patent is hereby corrected as shown below:

Title page in the title, please delete "BIDEGRADATION" and insert -- BIODEGRADATION -- therefor.

Title page, in the first line of the publications, please delete "Bireclamation" and insert -- Bioreclamation -- therefor.

At column 1, line 1, please delete "BIDEGRADATION" and insert -- BIODEGRADATION -- therefor.

At column 5, line 61, please delete "$2Na+H_2O \rightarrow 2NaOH+H_2$" and insert -- $2Na+2H_2O \rightarrow 2NaOH+H_2$ -- therefor.

Signed and Sealed this

Seventeenth Day of June, 1997

*Attest:*

BRUCE LEHMAN

*Attesting Officer*　　Commissioner of Patents and Trademarks

UNITED STATES PATENT AND TRADEMARK OFFICE
CERTIFICATE OF CORRECTION

PATENT NO. : 5,602,296
DATED : February 11, 1997
INVENTOR(S) : Joseph B. Hughes, et al.

It is certified that error appears in the above-indentified patent and that said Letters Patent is hereby corrected as shown below:

On title page, after "References Cited", please insert:

U.S. PATENT DOCUMENTS

| Patent No. | Date | Inventor | Class |
|---|---|---|---|
| 3,724,542 | 4/1973 | Hamilton | 166/246 |
| 4,351,978 | 9/1982 | Hatano, et al. | 585/469 |
| 4,401,569 | 8/1983 | Jhaveri, et al. | 210/747 |
| 4,696,747 | 9/1987 | Verstraete, et al. | 210/605 |
| 4,765,902 | 8/1988 | Ely, et al. | 210/610 |
| 4,810,365 | 3/1989 | Dohler, et al. | 208/262.1 |
| 4,816,138 | 3/1989 | Visser et al. | 208/179 |
| 5,006,250 | 4/1991 | Roberts, et al. | 210/610 |
| 5,017,289 | 5/1991 | Ely, et al. | 210/610 |
| 5,064,526 | 11/1991 | Rogers, et al. | 208/262.5 |
| 5,133,625 | 7/1992 | Albergo, et al. | 405/263 |
| 5,221,159 | 6/1993 | Billings, et al. | 405/128 |
| 5,263,795 | 11/1993 | Corey, et al. | 405/128 |
| 5,277,815 | 1/1994 | Beeman | 210/605 |

UNITED STATES PATENT AND TRADEMARK OFFICE
CERTIFICATE OF CORRECTION

PATENT NO. : 5,602,296
DATED : February 11, 1997
INVENTOR(S) : Joseph B. Hughes, et al.

It is certified that error appears in the above-identified patent and that said Letters Patent is hereby corrected as shown below:

| | | | |
|---|---|---|---|
| 5,342,769 | 8/1994 | Hunter, et al. | 435/166 |
| 5,393,428 | 2/1995 | Dilla, et al. | 210/631 |
| 5,398,757 | 3/1995 | Corte, et al. | 166/278 |

Signed and Sealed this

Tenth Day of February, 1998

Attest:

BRUCE LEHMAN

*Attesting Officer*     *Commissioner of Patents and Trademarks*